United States Patent Office 3,063,811
Patented Nov. 13, 1962

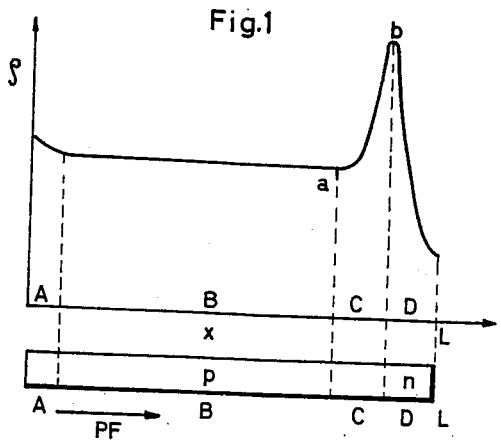
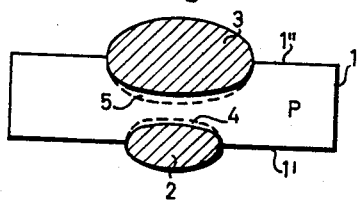

3,063,811
METHOD OF PRODUCING RODSHAPED BODIES OF CRYSTALLINE SILICON FOR SEMICONDUCTOR DEVICES AND SEMICONDUCTOR BODIES OBTAINED THEREFROM
Heinrich Kniepkamp, Munich-Solln, and Georg Rosenberger, Munich, Germany, assignors to Siemens & Halske Aktiengesellschaft, Berlin and Munich, Germany, a German corporation
Filed Nov. 5, 1958, Ser. No. 772,063
Claims priority, application Germany Nov. 11, 1957
13 Claims. (Cl. 23—223.5)

This invention is concerned with a method of producing rodshaped bodies of crystalline silicon with a degree of purity required for direct use thereof in semiconductor devices, from a pre-purified silicon compound, especially a silicon halide compound from which liberated silicon is by the application of heat or an electrical gas discharge respectively precipitated or deposited upon a heated preferably highly pure silicon carrier or caused to precipitate upon electrodes to form a rodshaped silicon body, whereupon such body is further purified by zone melting.

Corresponding methods are described in copending applications Serial No. 464,129 and 509,361, filed respectively October 22, 1954 and May 18, 1955, now both abandoned; the zone melting being described in copending application Serial No. 409,420, filed February 10, 1954. These copending applications, which are owned by the assignee named in the present case, also describe the required techniques applicable in the production of silicon rods as well as practical embodiments so that a detailed discussion thereof may be omitted. The steps to be observed in connection with the zone melting are described, for example, in "Review of Scientific Instruments," 25 (1954), pages 331 to 334, and detailed discussion thereof may therefore be omitted.

The zone melting method is adapted to remove from the silicon only impurities having a distribution coefficient differing greatly from 1; concerning the concept "distribution coefficient," reference may be made, for example, to W. G. Pfann, "Principles of Zone Melting," Transactions AINE (1952) 194, page 747, Journal of Metals, July 1952. Impurities having a distribution coefficient considerably smaller than 1, for example, aluminum or phosphorous, which therefore remain preferentially in the melting zone upon the drawing of such zone, accumulate responsive to relatively few drawing operations of the melting zone at the ends of the silicon body from which they are separated by cutting. The distribution coefficient of boron in silicon differs, however, relatively slightly from 1. Boron contaminations are accordingly only slightly affected by the zone melting and a great number of passes of the molten zone through a rod is required in order to affect the initially homogenous distribution of boron to such an extent that this contamination accumulates likewise at the end of the rod. The invention recognizes this peculiarity of boron.

The invention proceeds for this reason from silicon compounds which are carefully freed of materials acting in the silicon as donors or acceptors and particularly, having a distribution coefficient which is about equal to or greater than 1, and purifies the corresponding pre-purified silicon compound of boron in a further process, because this substance precipitates from the silicon compound upon the silicon carrier together with silicon, acting as acceptor, and because the substance has a distribution factor which is nearly 1.

This is accomplished as follows:

In order to obtain in accordance with the previously noted methods a rod of a single crystal which exhibits a high degree of purity and therewith low conductivity of only $10^{-2}$ ohm$^{-1}$ cm.$^{-1}$ or less, or which has due to defined doping with other substances a conductivity higher than $10^{-2}$ ohm$^{-1}$ cm.$^{-1}$, but which would have in the absence of the corresponding doping substances a conductivity of at the most about $10^{-2}$ ohm$^{-1}$ cm.$^{-1}$ (all conductivity values being referred to room temperature of about 20° C.) there shall be in the silicon compound of which the silicon rod is to be produced by decomposition, only about 1 boron atom to about $10^{11}$ silicon atoms. Accordingly, the silicon compound is to be purified of boron to such an extent that, if only boron contaminations were contained in the silicon rod produced from the compound by the initially mentioned method, such rod would be intrisically conducting.

The invention accordingly is concerned with a method of producing from silicon compounds purest compact silicon for semiconductor devices, wherein the silicon compound is initially freed of substances that would disturbingly act in the silicon as acceptors or donors, after which the silicon compound thus purified is, for example, thermally decomposed with simultaneous precipitation of the silicon thereby liberated upon a heated carrier consisting preferably of pure silicon free of boron, or in compact crystalline form upon electrodes which effect the gaseous discharge causing the decomposing, whereupon the silicon body thus formed is subjected to purification by zone melting. In accordance with the invention, the pre-purified silicon halide which is being employed is first chemically freed of boron halides down to a particularly low boron content, preferably at the most 1 boron atom to $10^{11}$, especially to 1 boron atom to about $10^{13}$ silicon atoms, and the rodshaped silicon body obtained by the precipitation step is by zone melting further purified of other contaminations still contained therein.

In order to accomplish the above, it is suggested to use a silicon halide and to free it in the described manner to a far reaching extent of boron, by adding to the liquid silicon halide to be used as initial substance which had been pre-purified in usual manner, for example, by distillation or in another chemical way, a substance that is adapted to bind the boron halide in the form of difficulty volatile addition compounds or complex compounds, but which does not enter into any combination or azeotropic mixture with the silicon halide, and subsequently separating the silicon halide by distillation from the boron halides and from the addition substance. The silicon body is thereupon produced from the silicon halide thus purified by decomposition in accordance with the previously explained method, and is thereafter freed by zone melting without the use of a crucible of other contaminations still contained therein. The amounts of these contaminations that may still be contained in the silicon compound is considerably greater than that of boron and, considering the total contaminations, may exceed that of the boron by one or more orders of magnitude.

The invention proposes a particularly advantageous method for freeing the silicon halides of boron halides contained therein as comtaminations, which is with known methods extraordinarily difficult and only partially effective. This phase of the invention is accomplished by adding to the liquid silicon halide which is to be purified of boron, prior or during distillation, a substance with a free electron pair, preferably a nitrogen atom, since such substances enter particularly stable and easily formed combinations with the boron halide. Particularly suitable are substances such as p-oxyazobenzol, propionitril and benzol-azonaphthol. These substances are not volatile and have at boiling temperatures of the silicon halides a negligibly low vapor pressure. The same is true of the addition compounds and of the complex compounds formed thereby with the boron halides. Moreover, they bind practically no silicon halide.

The silicon compound is thereafter by distillation separated from the addition substance and from the addition compoundns or complex compounds added to the silicon halide to be purified. In accordance with a further feature of the invention, an addition substance is preferably used for this purpose, having a boiling point as high as possible above that of the silicon halide, and the distillation is interrupted as soon as the temperature of the substance mixture to be separated by distillation begins to exceed the boiling temperature of the corresponding silicon halide. As a rule of thumb, it will suffice to discontinue distillation when the mixture to be distilled is reduced to about 1/10 of its original volume. In order to correctly apportion the amount of the addition substance to be added, it will be necessary to ascertain prior to the distillation the amount of boron contained in the silicon halide. This is done by employing methods usually applied in quantitative analytical chemistry. The amount of the addition substance is thereupon calculated based upon the chemical equation applying for the binding of the boron halides to the addition substance. It is for reasons of safety advisable to exceed the calculated amount by about 10% and to stir the mixture thoroughly.

P-oxyazobenzol is not liquid and forms at about 12–15° C. addition compounds with the boron halides, which only decompose at about 160° C. A complete separation of the silicon halide from the boron halides bound to the addition substance can therefore be effected at a boiling temperature of 32° C. (for $SiHCl_3$) or of 55° C. (for $SiCl_4$). Analytic investigations have revealed that, even when the silicon halide contained considerable amounts of boron halides, no boron could be detected in the distillate even with the use of micro analytical methods with a lower sensitivity limit lying at about $10^{-8}\%$. Similar conditions apply for other addition substances.

An example shall now be described:

To 10 kg. of commercially available, purified $SiHCl_3$ is added 1 g. of p-oxyazobenzol. The liquid becomes yellow because p-oxyazobenzol is dissolved in the $SiHCl_3$. The solution is left alone for about 24 hours. The $SiHCl_3$ is thereupon distilled off until a residue remains amounting to about 100 cc. This residue contains practically the total amount of the contaminating boron halide. If the silicon halide is not contaminated with further disturbing substances, the product purified in accordance with the invention will satisfy the purity requirements for silicon for semiconductor devices. Accordingly, pure silicon can be separated or precipitated from the substance thus purified.

The teaching of the explanations so far given therefore is, that the boron content of the initial silicon compound is to be reduced so far that the resulting silicon rod is in the absence of significant amounts of other contaminations intrinsically conducting at a normal temperature of 20° C. Other contaminations that might be present, may be removed by subsequent zone melting, and it is, therefore, possible by the method according to the invention, to obtain silicon rods with several thousand even up to several ten thousand ohm-centimeters at normal temperature. If the contamination content of these silicon rods is so low that it is with controlled doping of no consequent, there will result the decisive advantage of obtaining from these silicon rods after cutting off the end in which the contaminations are accumulated and after removal of all contaminations by several zone melting passages, and by correspondingly controlled doping, well reproducible silicon crystals with practically constant specific resistance over the entire rod.

However, in many cases, in the semiconductor technique, silicon is required having a considerably lower specific resistance, for example, 10–100 or only a few 1000 ohm centimeter. In accordance with the invention, highly pure compact silicon is produced for these purposes, by reducing the boron content of the pre-purified silicon compound—containing as a rule further contaminations, especially donors—to a value, corresponding with respect to the produced compact silicon body, to a purity of about 1 boron atom to at least about $10^6$ silicon atoms, and by additionally purifying the silicon rod obtained from this silicon compound by precipitation in an evacuated vessel, preferably under high vacuum, by zone melting carried out without crucible, with passage in one direction, until the rod becomes p-conducting over the greater part of its length.

In accordance with the invention, the zone melting is to be concluded when the part of the rod which has become p-conducting over the greater part of the length thereof has approximately the same specific resistance.

The method of separating silicon from a purified silicon compound, especially from silicon halides or silicon hydrides, by thermal or electrothermal reaction which may if desired be supported by a reduction agent such as hydrogen, and the precipitation of the liberated silicon upon a carrier consisting of highly pure silicon, will enable the art to produce very pure silicon, for example, in the shape of rodlike crystals.

As mentioned before, the purity that may be achieved is in many cases not required; however, it remains nevertheless desirable that the silicon rod obtained has at least over the greater part of its length only one conduction type and possibly also an approximately constant conductivity, and that this be accomplished in a manner as simple as possible. In accordance with a feature of the invention, the conduction type to be provided is the p-type determined by the boron. Moreover, inasmuch as the uniform distribution of the boron over the length of the silicon rod produced in the forming thereof is to be altered in the subsequent zone melting as little as possible, so as to obtain an approximately constant value of the p-conductivity, the number of melting zone passes through the rod must be kept small, which is achieved by vaporizing off the contaminations differing from boron, by the application of low pressure within the zone melting vessel incident to the shifting thereof to the end of the rod.

The present invention meets these requiremnts. The thought underlying the invention resides in utilizing for the production of the desired properties exactly those of the properties of boron which make it so very difficult highly pure silicon free of boron. Accordingly, in the method according to the invention, only the initial compound need not be as extensively purified of boron as would be necessary if it were desired to produce, for example, intrinsically conducting silicon, since the boron, in the method according to the invention, is to form an important component of the contaminations contained in the silicon rods obtained in the process. In the subsequent purification of the silicon rods by the zone melting method, exactly those of the properties of the boron which are in most cases unfavorable, namely, first, a distribution coefficient (segregation coefficient) lying nearly at 1 and, second, practically non-vaporization incident to zone melting, are moreover utilized, inasmuch as the zone melting is interrupted before the course of the boron concentration in the rod deviates, due to the zone melting, appreciably from the original constant course, resulting in this manner in obtaining a rod with uniform boron concentration over the greater part thereof. It must be considered in this connection that the boron, due to its distribution coefficient which differs negligibly from 1, is incident to frequent repetition of the zone melting (that is, responsive to a great number of passes of the molten zone) likewise transported, even though to a lesser extent than the remaining contaminations, to the end of the rod lying in the direction of the motion of the molten zone, where it accumulates. In the case of the remaining contaminations, this transport takes place appreciably quicker, so that the preponderant part of the rod is freed of the remaining contaminations responsive to relative few zone melting passes, while the rod is still pretty uniformly doped with boron. This portion of the rod accordingly has a conductivity based solely upon the presence of one single contamination.

In order to obtain a condition according to which the greater part of this range which has become p-conducting, has approximately the same specific resistance, that is, in other words, that all other contaminations are removed from the greater part of the range of the silicon rod that has become p-conducting, before the boron concentration has by the zone melting changed appreciably within this range as compared with its original condition, the zone melting is in accordance with the invention effected at such low pressure, that the disturbing contaminations are to a great extent vaporized off during the zone melting. As has been recognized in the course of the investigations underlying the invention, these remaining contaminations are transported to the end of the silicon rod lying in the direction of motion of the molten zone, by the zone melting following the production of the silicon, not only due to considerably more favorable distribution coefficient thereof, as compared with that of the boron, but there occurs simultaneously an appreciably vaporizing off of these contaminations, especially from the molten zone, if care is taken that the zone melting is effected in an environment of sufficiently low partial pressure of these contaminations, preferably at low gas pressure, for example, in a high vacuum. However, vaporizing off of the boron does not take place. The vaporizing off of the contaminations may also be expedited by continuous and thorough intermixing of the molten zone, for example, by means of an electromagnetically produced stirring of the molten zone. The reinfusion of the contaminations already vaporized off, into the molten zone, must be carefully avoided, which is most reliably accomplished by continuous evacuation of the vacuum vessel in which the zone melting is carried out. If desired, cooling may be applied which effects the precipitation of the vaporized contaminations in solid state at the walls of the vacuum vessel. It is advantageous to provide for a surface and temperature of the molten zone as great as possible, insofar as this can be done without danger to the mechanical stability of the molten zone, which also favors the use of an electromagnetic supporting field in carrying out the method according to the invention.

In order to obtain a reference point as to how often the zone melting is to be repeated, the course of the specific resistance in the silicon rod being treated must be continuously supervised. For this purpose, the zone melting is repeatedly interrupted, for example, after each two passes of the molten zone through the rod, and measurements are taken concerning the course of the specific resistance on the cooled rod. For this purpose, two probes may be used which are placed at the rod at constant spacing as small as possible, for example, at a spacing of 1 cm. or less, preferably at two points of identical rod diameter, whereby attention is to be paid to constant negligible transition resistance with avoidance of a rectifying effect or other phenomena that may falsify the measuring results. The measurements are distributed over the entire length of the silicon rod and plotted, for instance, in the form of a curve. In order to ascertain the extent to which the rod has become p-conducting, a device may be used operating to indicate the characteristic impedance by utilizing the rectification effect.

The ascertained resistance course along the rod being treated may be very different depending upon the number of the zone passes that have been effected. This will become apparent as the description progresses with reference to the accompanying drawing in which FIG. 1 shows an example of a distribution curve for the specific resistance to be aimed at in accordance with the teaching of the invention; and FIG. 2 shows an example of a semiconductor device employing a crystal wafer cut from a semiconductor rod produced in accordance with the invention.

In the upper part of FIG. 1 is indicated the qualitative course of the specific resistance $\varrho$ depending upon the distance $x$ from that end of the rod at which the deposit of the molten zone begins with the individual passes. The bottom part of the figure shows the zones of different conduction types in the rod (length L) resulting from this course of specific resistance. The molten zone is carried through the silicon rod in the direction of the arrow P$f$.

There is to be distinguished a starting range A in which the specific resistance drops somewhat stronger; a range B with an approximately constant course of the specific resistance; a portion C in which the resistance increases more or less steeply; and a portion D at the end of the rod in which the specific resistance generally drops abruptly. The ranges A, B, C and D may exhibit a behavior of the specific resistance considerably different from that shown in the figure. They may under some conditions be entirely absent, which is particularly true so far as part D is concerned, which is, however, seldom the case.

The course of the characteristic of the specific resistance, as shown in FIG. 1, is present when the remaining contaminations are vaporized off or transported to the end of the rod, by such a small number of zone passes, that a considerable alteration of the boron concentration, as compared with its original constant course, has not yet taken place. Such an alteration may generally have taken place merely in the starting region A since an alteration of the boron content must become manifest there, as well as at the other end of the rod, due to the zone melting operation. This alteration, however, will be the smaller, the fewer zone melting passes that were required to effect separation of the boron alone in part of the rod as great as possible. It is, however, also with respect to the range B important, to obtain desired results with as few zone passes as possible, because the alteration of the boron concentration grows in this range, that is, the mean inclination of the curve becomes ever greater with increasing numbers of zone passes and, moreover, the starting region A grows at the expense of the region B. The range B grows with increasing numbers of zone passes likewise at the expense of the region C. It will be necessary to seek between these phenomena the optimum since it is desirable to obtain in the region B a drop of the specific resistance as little as possible and at the same time as great a length of this region as possible. In accordance with investigations underlying this invention, the alteration of the specific resistance shall in this region B of the part of the rod that has become p-conductive, amount at the most to ±20% and preferably less than ±10% of the average value established for the region by measurements. The zone melting shall for this reason be concluded, after one or more passes of the molten zone through the rod, as soon as the specific resistance within the region B which accounts for at least approximately 50% to 60% of the total length of the rod and has become p-conducting, deviates by less than ±20%, preferably less than ±10% and especially less than ±5% from the average value of the specific resistance of this region. The entire region of the rod portion that has become p-conducting can accordingly be further processed for semiconductor devices without requiring balancing of the boron content by the application of a particular balancing operation. Therein resides one of the decisive advantages of the method according to the invention. If desired, the starting region may also be utilized, above all, when the fluctuations of the specific resistance within the total of the regions A and B, about the average value taken for the total region, remains within the specified tolerances. The suitable specified tolerances may be narrowed or increased if desired.

Upon following the teaching according to the invention, the starting regions A and B will respectively account for about 5–10% and at least 50–60% of the total rod length L. The length will be the greater the smaller the proportion of the remaining contaminations and in accordance with the extent to which these contaminations are separated.

The behavior of the specific resistance in the regions C and D will be increasingly affected by the remaining contaminations and therefore depends very much upon the character and the respective proportions of the remaining contaminations in these regions. The smaller the contamination except boron, the more will the regions B and C crowd together at the rod end to which the contaminations are carried by the molten zone. This crowding together of the regions B and C is, however, also attainable by a sufficiently great number of zone passes. However, as already mentioned, the boron concentration in the remaining portions, above all in the portion B, will thereby be affected detrimentally, and it is accordingly in the interest of a specific resistance as constant as possible, inadvisable to make the duration of the zone melting dependent upon the maximum length of the region B that may thereby be obtained, because the gain in length of this region would be obtained at the expense of decrease of the constancy of the specific resistance in such region.

The region C is still p-conductive. The increase of the specific resistance in this region is, however, not traceable to a decrease of the boron concentration, but to an increase of donors which increasingly compensates the influence of the boron with respect to the specific resistance. The maximum $b$ between the regions C and D is connected with the appearance of a pn-junction in the silicon rod. The course of the specific resistance in the region D is determined by the cooperative action of all contaminations transported by the zone melting to the end of the rod, and such course may therefore be very different. For example, a flipping of the conduction type from n to p is entirely possible. Due to the great proportion of contaminations of unknown character, the regions C and D of the semi-conductor rod will always be unusable and therefore must be cut off. This cutting off is effected between the regions B and C at a point $a$, such point being generally characterized by the appearance of a minimum of the specific resistance.

It is in accordance with the invention advisable to keep the content, for example, of donors, in the initial silicon compound particularly low, going beyond the results of the customary purification procedure, since the length of the region B is favorably affected thereby. It is, however, in many cases advisable to forego such purification. The reasons are as follows:

First of all, the donors and also the remaining contaminations may be removed well by the zone melting, especially if care is taken to provide for satisfactory vaporizing off of the contaminations in accordance with the teaching of the invention. To obtain the same results by the application of particular purification going beyond the limits obtained by customary purification of the silicon compound requires for each individual contamination substance a special purification procedure which, moreover, requires accurate knowledge with respect to the individual disturbing contamination substances. Experience teaches that unknown substances frequently occur as contaminations acting, for example, as donors, acting so far as their distribution coefficients are concerned only slightly more favorable than boron but, contrary to boron, vaporize off very well during the zone melting. The chemical separation of such unknown substances can accordingly be omitted.

There are several possibilities for the behavior of the specific resistance in the regions C and D, which deviate from the behavior represented in FIG. 1, and detailed discussion of which need not be entered into. Attention may, however, be called to the fact that any strong alteration of the specific resistance in the vicinity of the end of the rod lying in the direction of motion of the molten zone, regardless of whether the alteration is in the form of a strong increase or decrease, can be almost invariably traced to the action of other contaminations; accordingly, the p-conducting region of the rod will be useful only up to the corresponding place. It follows, therefore, that the portions C and D lying contiguous to the region B with constant or approximately constant specific resistance, and exhibiting strong variations of the specific resistance, must be cut off from the remaining p-conducting part of the rod.

The silicon rods produced in accordance with the invention, if desired, after cutting off of unusable regions such as C and D and if desired also of the starting region A, may be directly processed for use in semiconductor devices. Since the region B, that is, the useful rod portion, has a constancy of the specific resistance which is for most uses sufficient, and which is the greater the fewer zone melting passes had been necessary, silicon semiconductor bodies for rectifiers, transistors or the like, may be advantageously produced by altering only the n-conducting zones of the silicon crystals obtained by cutting from the rod made according to the invention, in respect of their conductivity or conduction type, by changed doping, especially by alloying thereinto doping substances acting as donors; a subsequent doping of the zones of the desired silicon body is in many cases unnecessary because, due to corresponding adjustment of the boron content of the initial silicon compound and therewith of the silicon rod obtained therefrom, the part which has not been made n-conducting already exhibits the required conductivity type and specific conductivity.

An example is shown in FIG. 2 in which numeral 1 indicates a circular disk shaped wafer of a silicon crystal cut from the region B of the silicon rod (FIG. 1), such crystal forming the p-conducting semiconductor body of an npn-transistor, while the n-zones 2 and 3, serving respectively as emitter and collector, are produced by alloying thereinto at the opposite surfaces 1', 1" donor material 4 and 5. The circular wafer 1 is in simple manner obtained by cutting the p-conducting region the silicon rod. It is thereby advantageous to cut the wafer off perpendicular to the axis of the rod and to make it thin (measured in the longitudinal direction of the rod, that is, perpendicular to the wafer surfaces) so as to keep alterations of the specific resistance in the p-conducting part of the silicon body as small as possible.

It is also advantageous to carry out the silicon separation or precipitation upon a carrier exhibiting over its entire length a uniform p-conductivity determined by boron, such conductivity being preferably within the range of conductivity of the rod to be produced or better yet, approximately corresponding to that of the rod. Such a carrier may be obtained in accordance with a previously proposed method by drawing from a silicon rod produced by the invention.

It will be understood from the foregoing explanations that silicon may be liberated or separated from a silicon compound, preferably from a silicon halide compound by the application of heat or an electrical gas discharge effected between electrodes, and that the separated silicon may be deposited or precipitated upon a heated carrier consisting preferably of highly pure silicon, or upon an electrode or electrodes employed for the gas discharge, to form the rod shaped silicon body which is thereupon further purified by zone melting carried out without the use of a crucible; and, accordingly, the terms "silicon compound" and "application of heat" and "carrier" as used in the appended claims are unless otherwise limited intended to include "silicon halide," as "an electrical gas discharge" and "an electrode or electrodes" as well as "highly pure silicon," respectively.

Changes may be made within the scope and spirit of the appended claims which define what is believed to be new and desired to have protected by Letters Patent.

We claim:

1. A method of producing compact crystalline silicon rods, comprising mixing a pre-purified silicon halogen compound in liquid condition thereof with a nitrogen-containing chemical compound, p-oxyazobenzol, which will precipitate any boron halides present in the form of difficultly volatilizable compounds such as addition and complex compounds, subsequently by distillation separating said chemical compound from any such precipitate, transforming the silicon halide into gaseous condition and causing it in such condition to contact a highly heated highly pure silicon carrier contained in a reaction vessel so as to effect crystallization of the silicon liberated from the silicon halide upon said carrier, to produce a rodlike silicon body, and subjecting said body to zone melting for the purpose of effecting further purification thereof.

2. A method of producing compact crystalline silicon rods, comprising mixing a pre-purified silicon halogen compound in liquid condition thereof with a nitrogen-containing chemical compound, propionitril, which will precipitate any boron halides present in the form of difficultly volatilizable compounds such as addition and complex compounds, subsequently by distillation separating said chemical compound from any such precipitate, transforming the silicon halide into gaseous condition and causing it in such condition to contact a highly heated highly pure silicon carrier contained in a reaction vessel so as to effect crystallization of the silicon liberated from the silicon halide upon said carrier, to produce a rodlike silicon body, and subjecting said body to zone melting for the purpose of effecting further purification thereof.

3. A method of producing compact crystalline silicon rods, comprising mixing a pre-purified silicon halogen compound in liquid condition thereof with a nitrogen-containing chemical compound, benzol-α-azonapthol, which will precipitate any boron halides present in the form of difficultly volatilizable compounds such as addition and complex compounds, subsequently by distillation separating said chemical compound from any such precipitate, transforming the silicon halide into gaseous condition and causing it in such condition to contact a highly heated highly pure silicon carrier contained in a reaction vessel so as to effect crystallization of the silicon liberated from the silicon halide upon said carrier, to produce a rodlike silicon body, and subjecting said body to zone melting for the purpose of effecting further purification thereof.

4. A method of producing compact crystalline silicon rods, comprising mixing a pre-purified liquid $SiHCl_3$ with a nitrogen-containing chemical compound, oxyazo-benzol, in a ratio of 1 g. oxyazobenzol for each 10 kg. $SiHCl_3$, which will precipitate any boron halides present in the form of difficultly volatilizable compounds such as addition and complex compounds, subsequenly by distillation separating said chemical compound from any such precipitate, transforming the silicon halide into gaseous condition and causing it in such condition to contact a highly heated highly pure silicon carrier contained in a reaction vessel so as to effect crystallization of the silicon liberated from the silicon halide upon said carrier, to produce a rodlike silicon body, and subjecting said body to zone melting for the purpose of effecting further purification thereof, said subsequent distillation being effected after about 24 hours to separate from the mixture oxyazobenzol save for a residue of about 100 cm.$^3$ for each 10 kg. of the initially employed $SiHCl_3$, the $SiHCl_3$ obtained in said distillation being in gaseous condition intermixed with hydrogen and conducted as reaction gas into the reaction vessel containing said heated carrier, the heat of said carrier causing liberation of elementary silicon from said reaction gas for crystallization upon said carrier and thereby forming said rodshaped silicon body.

5. A method of producing compact crystalline silicon rods, comprising mixing a pre-purified silicon halogen compound in liquid condition thereof with a nitrogen-containing chemical compound, selected from a group comprising p - oxyazobenzol, propionitril and benzol - α-azonapthol, which will precipitate any boron halides present in the form of difficultly volatilizable compounds such as addition and complex compounds, subsequently by distillation separating said chemical compound from any such precipitate, transforming the silicon halide into gaseous condition and causing it in such condition to contact a highly heated highly pure silicon carrier contained in a reaction vessel so as to effect crystallization of the silicon liberated from the silicon halide upon said carrier, to produce a rodlike silicon body, and subjecting said body to zone melting for the purpose of effecting further purification thereof.

6. The method according to claim 5, wherein said distillation is continued during relatively constant temperature of the mixture of silicon halide and said chemical compound and discontinued upon a pronounced increase in such temperature.

7. The method according to claim 5, wherein the boron content of the silicon halide compound is adjusted to an increased value amounting at the most to 1 boron atom per $10^6$ silicon atoms, to produce from such halide a rodlike silicon body having a correspondingly high boron content, said zone melting being effected so that the adjusted boron level remains in the rodlike silicon body substantially unaffected while other contaminations are quantitatively removed therefrom.

8. The method according to claim 7, wherein said zone melting is effected in a vacuum.

9. The method according to claim 7, comprising checking after each two passes applied in said zone melting the distribution of the specific resistance along the produced silicon body, and concluding the zone melting upon ascertaining that the silicon body has become p-conductive over the greater part of its length and that the specific resistance in the corresponding region of the body has become so uniform as to exhibit fluctuations in such region amounting to at the most ± 10 percent of the mean value in such region.

10. The method according to claim 7, comprising continuously evacuating the reaction vessel during said zone melting.

11. The method according to claim 7, wherein said zone melting applied to said rodlike silicon body involves a starting zone and a zone contiguous thereto amounting to at least 50–60 percent of the length of said body which region is to be made p-conductive, and discontinuing said zone melting upon ascertaining deviations of specific resistance in said p-conducting zone amounting to appreciably less than ±20 percent of the average specific resistance obtaining therein.

12. The method according to claim 11, comprising separating from the completed rodlike silicon body a portion contiguous to said p-conducting zone which portion exhibits stronger variations of specific resistance.

13. A method of preparing compact crystalline silicon rods from a purified silicon halogen compound, comprising the step of intermixing a liquid pre-purified silicon halogen compound including a boron halogen compound with p-oxyazobenzol, separating the silicon halogen, by distillation, from the precipitate formed containing the boron halogen compound, transferring the silicon halogen compound into gaseous condition and bringing it into contact, in a reaction vessel, with a highly pure silicon carrier suitably mounted therein, which is heated to high temperature, whereby silicon liberated from the gaseous of the carrier and crystallized thereto so as to produce a silicon halogen compound is precipitated upon the surface rodlike silicon body, and further purifying such body by zone melting.

References Cited in the file of this patent

UNITED STATES PATENTS

| | | |
|---|---|---|
| 2,692,839 | Christensen et al. | Oct. 26, 1954 |
| 2,880,117 | Hanlet | Mar. 31, 1959 |

FOREIGN PATENTS

| | | |
|---|---|---|
| 200,917 | Australia | Feb. 16, 1956 |

OTHER REFERENCES

William G. Pfann, Zone Melting (New York: John Wiley and Sons, March, 1958), p. 158–161.